[19] United States Patent
Taylor

[11] 4,308,810
[45] Jan. 5, 1982

[54] APPARATUS AND METHOD FOR REDUCTION OF NOX EMISSIONS FROM A FLUID BED COMBUSTION SYSTEM THROUGH STAGED COMBUSTION

[75] Inventor: Thomas E. Taylor, Bergenfield, N.J.

[73] Assignee: Foster Wheeler Energy Corporation, Livingston, N.J.

[21] Appl. No.: 138,799

[22] Filed: Apr. 9, 1980

[51] Int. Cl.³ .......................... F23M 3/04; F23K 1/00
[52] U.S. Cl. ...................................... 110/347; 431/10; 122/4 D
[58] Field of Search ............... 110/347, 245, 234, 214; 122/4 D; 431/7, 10, 170

[56] References Cited

U.S. PATENT DOCUMENTS

| | | | |
|---|---|---|---|
| 3,110,300 | 11/1963 | Brown et al. | 122/4 D |
| 3,119,378 | 1/1964 | Marshall | 122/4 D |
| 3,356,075 | 12/1967 | Livingston | 431/10 |
| 3,746,498 | 7/1973 | Stengel | 431/10 |
| 3,890,084 | 6/1975 | Voorheis et al. | 431/10 |
| 4,021,186 | 5/1977 | Tennev | 431/10 |
| 4,050,877 | 9/1977 | Craig et al. | 431/10 |
| 4,054,407 | 10/1977 | Carrubba et al. | 431/10 |
| 4,116,005 | 9/1978 | Willyoung | 122/4 D |
| 4,246,853 | 1/1981 | Mehta | 110/347 |

FOREIGN PATENT DOCUMENTS 2034448 6/1980 United Kingdom ............... 122/4 D

Primary Examiner—Henry C. Yuen
Attorney, Agent, or Firm—Marvin A. Naigur; John E. Wilson; John J. Herguth, Jr.

[57] ABSTRACT

Apparatus and method for the reduction of nitrogen oxides (NOx) in the emissions of a fuel burning fluidized bed combustion system. Using a staged combustion technique, an overfire air inlet is provided in the freeboard zone above the bed. In the first stage, residual oxygen ($O_2$) in the off-gas just above the bed is held in the 0.4 to 0.8% range by the actual coal and air rates. In the second stage, carbon monoxide (CO) and unburned hydrocarbons, both present in the first stage off-gas, are combined with additional air using the overfire air inlet. CO levels in the final effluent are reduced with little or no increase in NOx emissions.

7 Claims, 4 Drawing Figures

RUN 2
STAGED COMBUSTION TEST
NOₓ & SOₓ EMISSION DATA

RUN 1
STAGED COMBUSTION TEST
NOₓ & SOₓ EMISSION DATA

APPARATUS AND METHOD FOR REDUCTION OF NOX EMISSIONS FROM A FLUID BED COMBUSTION SYSTEM THROUGH STAGED COMBUSTION

BACKGROUND OF THE INVENTION

1. Field of the Invention

The invention is in the field of fuel burning fluidized bed combustion systems. More particularly, the invention relates to an apparatus and method for the reduction of NOx emissions from a fluidized bed combustion system.

2. Description of the Prior Art

In the Carruba et al patent (U.S. Pat. No. 4,054,407), a fluidized catalyst bed is taught (col. 6, lines 29–30) for use in a method of two stage combustion employing a fuel containing nitrogen and a catalyst. The Carruba et al method comprises forming a first mixture of the fuel and an amount of air substantially less than the amount needed for complete combustion of all the combustible components in the fuel, and combusting this first mixture in a first combustion zone in the presence of a catalyst, having an operating temperature below a temperature that would result in any substantial formation of oxides of nitrogen or other fixed nitrogen compounds from atmospheric nitrogen present in the mixture, to form a first effluent. The first effluent is mixed with an additional amount of air at least sufficient for complete combustion of all combustible components remaining in the first effluent to form a second mixture, which is combusted in a second combustion zone below a temperature that would result in any substantial formation of oxides of nitrogen from atmospheric nitrogen. The present invention, by contrast, employs a non-catalytic but chemically reactive fluidized bed.

In the Tenner patent (U.S. Pat. No. 4,021,186), there is disclosed a method and apparatus for reducing NOx from non-fluidized bed furnaces. NOx produced by combustion of nitro-containing fuels is reduced by a forced draft burner operating with below stoichiometric mixtures of air and fuel in a primary combustion chamber, combustion being completed by controlled injection of secondary air near the outlet of the chamber.

SUMMARY OF THE INVENTION

The invention is an apparatus and method for the reduction of nitrogen oxides (NOx) in the emissions from a fluidized bed combustion system burning a nitrogen-bearing fuel. The fluidized bed combustion process has already demonstrated the ability to produce lower NOx emissions than conventional combustion systems. Typically, NOx emission levels from both pilot- and demonstration-scale units have been in the 275–600 ppm range while burning a 1% nitrogen coal (calculated at 3% $O_2$).

Currently, proposed standards in the state of California for process heaters (model rule) will require an NOx emissions level of less than 100 ppm by volume calculated at 3% $O_2$. The apparatus and process of this invention meet and surpass these stringent limits and thus will prevent the use of coal for these applications.

Simply stated, the method employed is one of staged combustion. In it, the bed is operated with very little residual $O_2$ in the off-gas (for example, 0.4–0.8%). On an as-fired basis, the actual coal and air rates result in a substoichiometric mixture. CO emissions are of the order of 0.8% with trace amounts of methane and other hydrocarbons also present. While the actual mechanism is unclear, the above operating conditions produce extremely low NOx emissions. When calculated at 3% residual $O_2$, they amount to 45–81 ppm of NOx by volume. To reduce CO and methane to acceptable levels, overfire air is then added just below the upper convection bundle. The rate is adjusted to increase the residual $O_2$ in the off-gas to approximately 1%. This results in a large reduction of the CO with little or no increase in NOx emissions.

Addition of air near the convection bank permits reaction between the CO and $O_2$ but limits the gas temperature, thereby preventing formation of additional NOx. The additional air also results in true excess air on an as-fired coal and air rate basis.

The process has been demonstrated at several superficial velocities and bed temperatures with similar results. There appears to be no degradation of the sulfur capture performance of a limestone bed, if in use.

DESCRIPTION OF THE PREFERRED EMBODIMENTS

Over the course of several years, it has become evident to the inventor that the existence of more than trace amounts of carbon monoxide in the off-gas from a fluidized bed or the operation which promoted CO in the off-gas was effective in the reduction of NOx emissions from the bed. These observations were sometimes dramatically demonstrated when coal feeding problems resulted in a fuel-rich mixture and therefore substoichiometric operation. Under these conditions, emissions of the oxides of nitrogen were observed to fall to levels under 20 ppm by volume. The CO and hydrocarbons emissions which resulted were, of course, far higher than could be tolerated in continuous operation. It was believed by the inventor that these could be lowered with overfire air using staged combustion. While it has never been determined whether CO was entering into a reduction reaction with the NOx or whether the reduced emissions were due to a low oxygen partial pressure, the results were extremely beneficial. Utilization of this phenomenon in a fluidized bed for NOx reduction had never been seriously considered because of the adverse effect of partially reducing conditions on sulfur capture.

Figure 1:
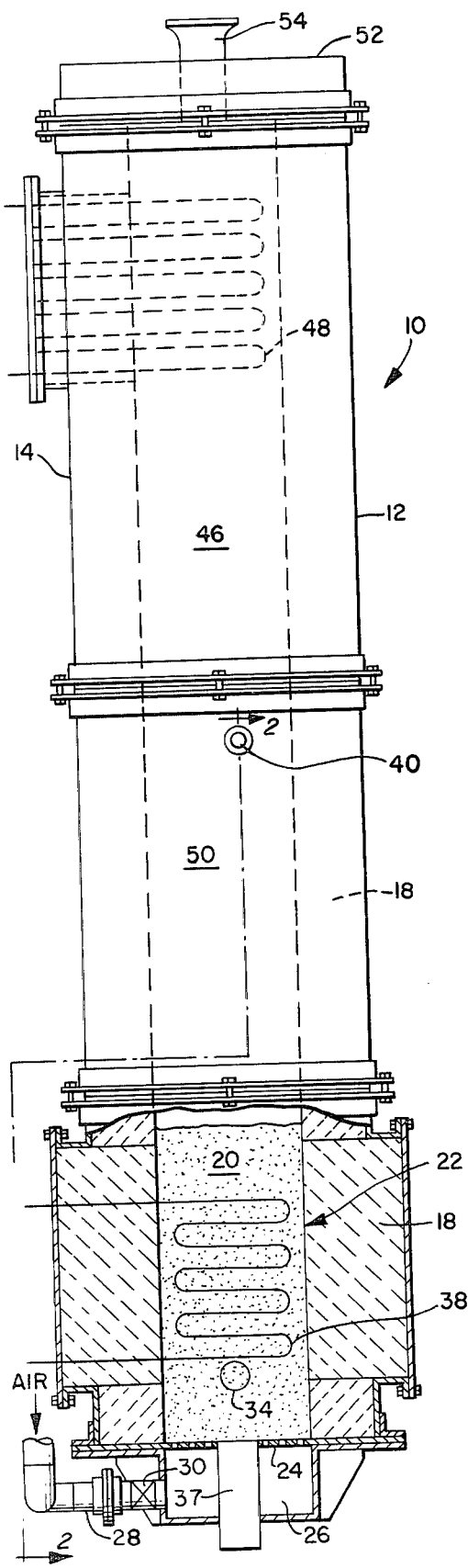
FIG. 1 is a side elevational view of a pilot plant combustion system constructed in accordance with the principles of the present invention. The lower portion is shown in partial vertical section.
Figure 2:
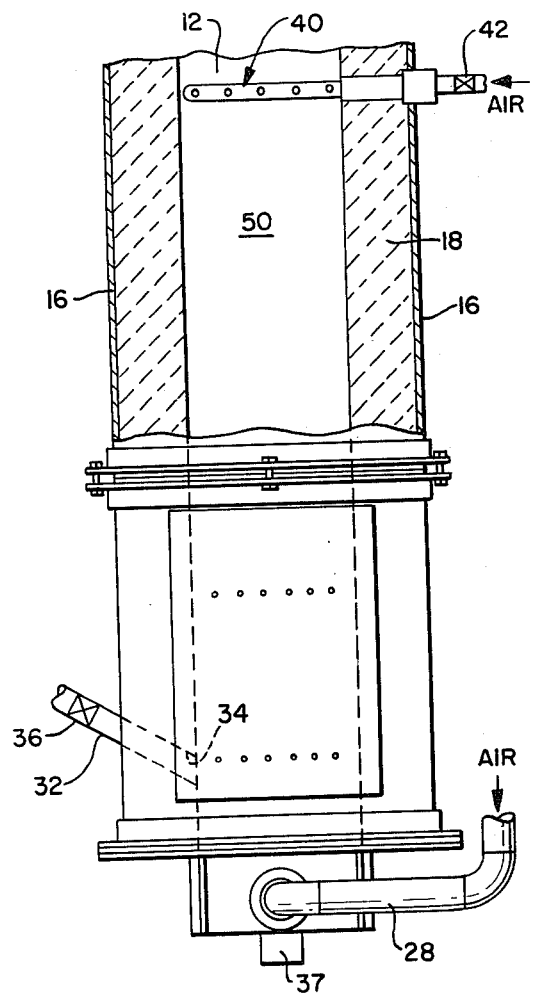
FIG. 2 is a partial vertical sectional view taken along line 2—2 in FIG. 1.

Referring to FIGS. 1 and 2 of the drawings, reference numeral 10 refers in general to a pilot plant atmospheric fluidized bed combustor unit chosen for the purpose of illustrating the principles of the invention. The application of the principles of the invention to a commercial combustion system (e.g., a boiler or steam generator or similar type device) is considered to be part of the invention and would be routine to a person of ordinary skill in the art given the description herein.

The combustor 10 has a front wall 12, a rear wall 14, and two sidewalls 16. Each wall is lined with a refractory material 18 it being understood that a commercial combustion system embodying the invention would have a means for heating water or generating steam, such as a water wall enclosure, in place of the refractory material 18.

A non-catalytic, but chemically reactive, fluidized bed of particulate material, maintained at approximately atmospheric pressure, is shown in general by reference numeral 20. The bed 20 is disposed within a primary combustion chamber 22 and is supported by a perforated distribution plate 24 extending horizontally in the lower portion of the unit. The bed 20 can consist of a mixture of discrete particles of inert material, fuel material such as coal, and an adsorbent (e.g., limestone particles) for the capture of sulfur oxides (SOx) released during combustion of the fuel material. Other fuels which may be used are medium to high nitrogen fuels such as sewage sludge, certain types of municipal waste, and residual fuel oil.

An air plenum 26 is provided immediately below the plate 24 and an air inlet 28 is provided through the rear wall in communication with the plenum 26. Air for primary combustion of the fuel and for fluidizing the bed 20 is provided to the plenum 26 from an external source such as a compressor or pump (not shown) through air inlet 28. An air flow regulating valve 30 is suitably mounted in the inlet 28 and acts to vary the effective opening in the inlet and thus control the flow of air into the plenum 26. In place of the valve 30, air dampers of a conventional design could be employed. A bed light-off burner (not shown) is mounted through the front wall immediately above the plate 24 for initially lighting off the bed 20 during startup.

An in-bed fuel feeder pipe 32 (FIG. 2) is provided in communication with a feeder port 34 in one sidewall 16. The feeder pipe 32 receives relatively fine particulate coal from an external supply and is adapted to feed the relatively fine coal particles through the feeder port 34 into the bed 20 in a conventional manner such as by pneumatic conveyance. The quantity of fuel supplied to the bed 20 through the feeder pipe 32 is controlled by a metering device shown schematically as 36 suitably mounted in the feeder system. It is understood that feeder pipes 32 can also be provided through one or more of the front wall 12, the rear wall 14 and the other sidewall 16. Optionally, a plurality of overbed feeders may be provided in lieu of the in-bed feeders. A drain pipe 37 is provided through the plate 24 in communication with the bed 20 to withdraw the spent fuel material, primarily in the form of ashes, from the bed.

Disposed within the bed 20 are multiple in-bed cooling coils 38 extending inwardly through the wall 14, through which water, or other fluids, are passed to remove heat from the bed 20.

A horizontally extending overfire air distribution pipe 40 is provided in the combustor 10 at an elevated position relative to the bed 20. The pipe 40 extends through a sidewall 16 and has a flow regulating valve 42 for controlling the volume of air supplied by an external source (not shown) such as an air pump or compressor. The pipe 40 has a plurality of perforations extending therethrough for passage of the air into a secondary combustion zone 46 which extends from an area immediately adjacent the pipe and upwardly to the upper portion of the combustor 10. It is understood that, as an alternate to the air distribution pipe 40, a distribution grid, a manifold of sparger pipes, or a plurality of wall jets could be used for injecting an adequate quantity of air into the secondary combustion zone 46.

As will be explained in detail later, the additional quantity of oxygen in the air injected by the pipe 40 chemically combines with the CO and other combustible gases in a second stage combustion or oxidation process.

A bank of convection coils 48 is provided in the upper portion of the secondary combustion chamber 46 for passing water, or other fluids, to be heated and a freeboard zone 50 is disposed between the primary combustion zone at the location of the fluidized bed 20 and the secondary combustion zone 46. As a result, the off gases passing from the fluidized bed 20 are cooled before they enter the secondary combustion zone 46.

The combustor 10 includes a roof 52 through which an outlet 54 is provided for exhausting the exhaust gases from the secondary combustion zone 46 to a stack or other external equipment.

To confirm the validity of the present invention, a relatively lengthy test protocol was chosen. Primary objectives of this protocol were:
(1) Confirmation of the validity of $NO_x$ reduction results obtained during batch tests in a test where chemical equilibrium is approximated.
(2) Documentation of the stoichiometry requirements of each stage of the process.
(3) Documentation of combustion efficiency, sulfur capture, and gaseous emissions.
(4) Determination of the effect of the process on bed chemistry.

The protocol test was run using a perforated 1-inch stainless steel schedule 40 pipe as the air distributor pipe 40. The precise location of the air distributor pipe 40 was determined by conventional heat balance methods. As the off-gas from fluidized bed 20 passes up through the freeboard zone 50, it is cooled by radiation and convection. There are temperature limits below and above which the desired second stage oxidation reaction of CO will not occur, with a preferred range being approximately 1300° to 1650° F. To speed the installation and to reduce measurement problems, 120 psig compressed air was used to supply the overfire air distributor pipe 40.

A low sulfur coal and commercially-available limestone were used in this test. The coal had the following analysis;

COAL ANALYSIS

C: 68.51 (% by weight)
H: 5.19
O: 12.61
N: 1.16
S: 0.66
Ash: 6.92
$H_2O$: 4.95
Higher heating value: 12,270 BTU/lb A superficial velocity of 4 fps and an average bed temperature of 1550° F. were chosen as conditions for the staged combustion protocol test. The bed temperature should be within the range of approximately 1500° to 1650° F.

The 50-hour test protocol was divided into periods of approximately 20 hours duration for startup-stabilization and 30 hours for testing. Operating conditions were then varied to obtain the optimum results with respect to NOx, SOx, and CO emissions.

The general procedure for testing each set of conditions consisted of the following steps: First, combustor 10 was stabilized at a given superficial velocity and residual $O_2$ (nominally 4 fps and 2% $O_2$). Next, the coal feed rate was slowly increased to a point where NOx was reduced to the target level (60-70 ppm). Normally, this resulted in a residual $O_2$ concentration of 0.4% and a CO concentration of 0.6-1.2%. Finally, the overfire air distributor pipe 40 was turned on until the CO emissions reduction was maximized without exceeding the NOx maximum emissions target level (100 ppm). The best of these quickly screened conditions was then maintained for the 30 hours of stabilized testing.

In order to perform complete combustion efficiency calculations on the staged combustion process, two combustion evaluation runs were made during the 30-hour test. Results from these combustion checks (Runs 1 and 2), which were of 8- and 6-hours duration, respectively, appear in Tables 1, 2, and 3, below, and in FIGS. 3 and 4.

Figure 4:
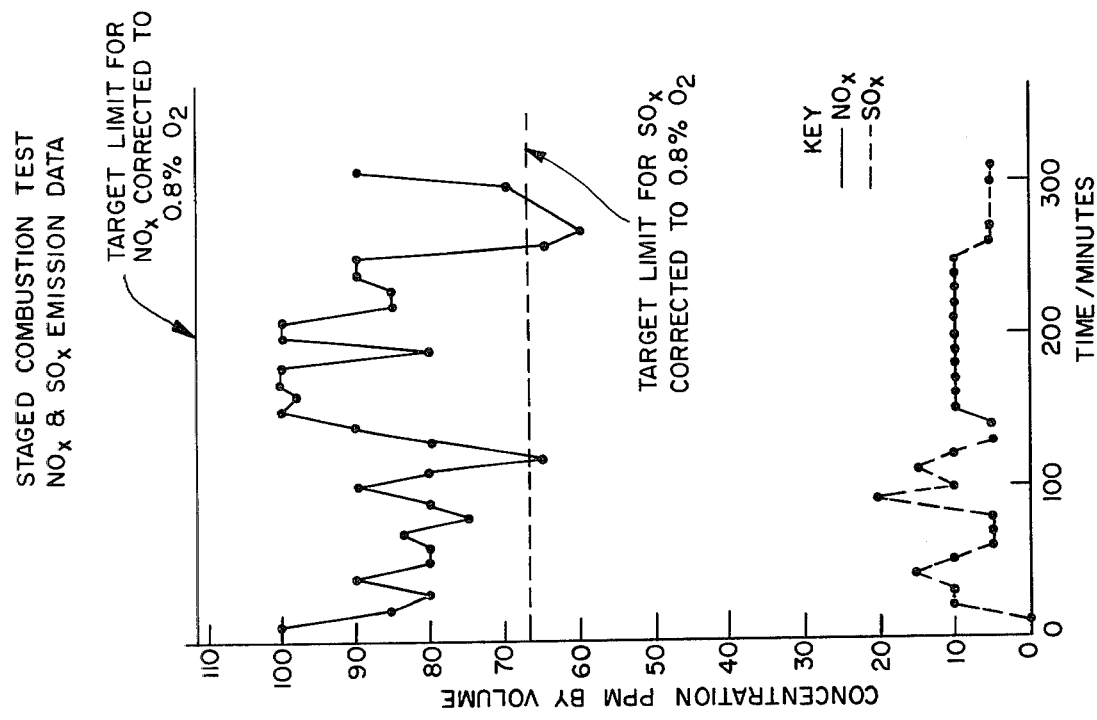
FIG. 4 is a graph showing the NOx and SOx emission data for run 2 of a pilot plant combustion system constructed and operated according to the principles of the invention.
Figure 3:
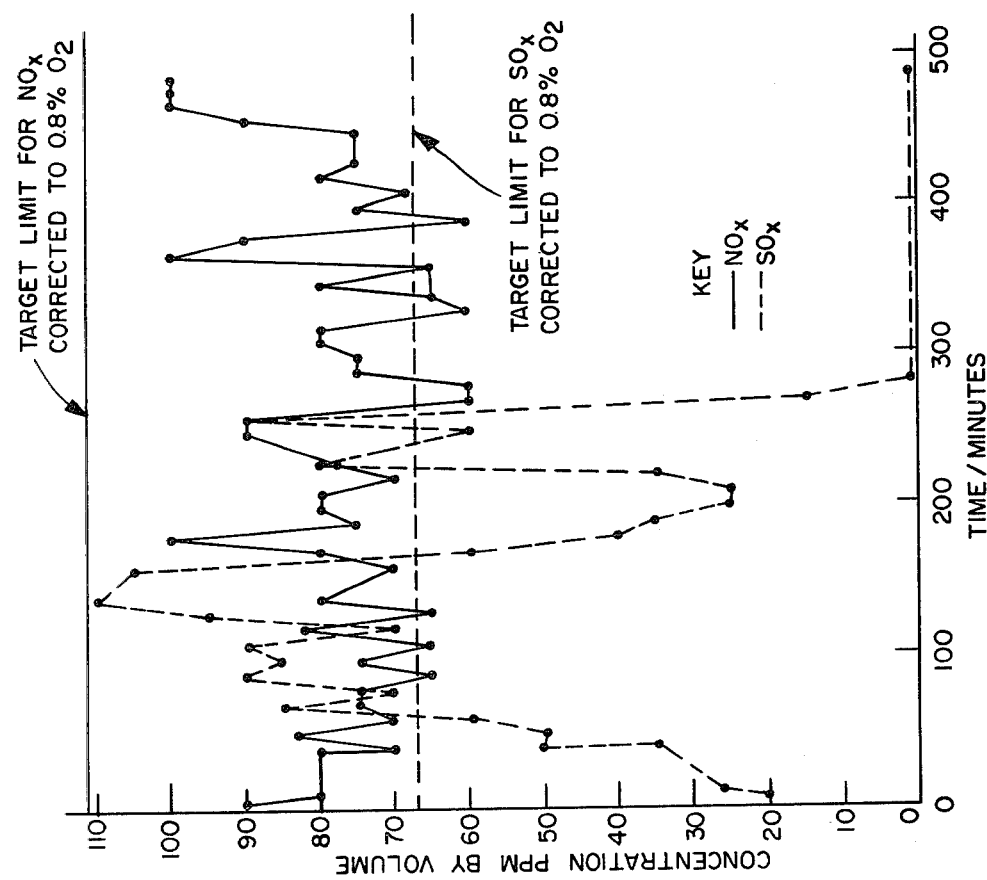
FIG. 3 is a graph showing the NOx and SOx emission data for run 1 of a pilot plant combustion system constructed and operated according to the principles of the invention.

Table 1 presents a summary of the operating conditions maintained during the staged combustion test and the average emissions which resulted. To permit direct comparison of the results to target limits, reported values have been corrected to 3% residual $O_2$. Examination of these results will show that the average value maintained during both runs for both NOx and SOx was below target limits. As shown in FIG. 3, instantaneous values of SOx in Run 1 did, in some cases, exceed the 60 ppm target limit. This problem was eliminated by slight changes in the operating conditions as can be seen in FIG. 4 showing the results from Run 2.

emissions reductions were accomplished with a higher overall excess air rate which resulted in lower CO emissions.

TABLE 2

| | STAGED COMBUSTION AIR DISTRIBUTION | | | | | | |
|---|---|---|---|---|---|---|---|
| RUN # | Coal Flow (lb/h) | Primary Air (lb/h) | % Stoich. Air | % CO prior to Overfire Air | Overfire Air (lb/h) | Cumul. % Stoichiometric Air | % Oxygen in Off-Gas |
| 1 | 111.25 | 801 | 85.30 | 0.8 | 178.70 | 103.90 | 0.80 |
| 2 | 108.40 | 793 | 86.39 | 0.8 | 156.58 | 103.45 | 0.70 |

A better idea of the NOx and SOx reduction picture can be obtained in FIGS. 3 and 4. These graphs present the actual measured NOx and SOx concentrations at 10-minute intervals for Runs 1 and 2. Reference lines representing the target limits for these pollutants have been corrected to the residual $O_2$ maintained during the test. As can be seen in all cases, the NOx emissions are well within the target limits. Similarly, the SOx emissions for Run 2 also meet the limits by a wide margin.

As shown in Table 1, above, combustion efficiency determined during the two combustion checks (Runs 1 and 2) was found to be 96.7% and 94.9% respectively, based upon carbon combustion. Table 3, below, presents an accounting of the distribution of the carbon combustion efficiency losses for each run. As might be expected, the cyclone fines represent the largest single loss amounting to 66.16% and 76.21%, respectively, of the total carbon loss in each run.

TABLE 3

| CARBON LOSS ACCOUNTING | | |
|---|---|---|
| | Combustion Efficiency % Loss | % Total Loss |
| Run 1 | | |
| Baghouse Dust | 0.647 | 19.42 |
| Cyclone Dust | 2.206 | 66.16 |
| CO in Off-Gas | 0.480 | 14.42 |
| | 3.333 | 100.00 |
| Run 2 | | |
| Baghouse Dust | 0.639 | 12.65 |
| Cyclone Dust | 3.881 | 76.21 |
| CO in Off-Gas | 0.563 | 11.14 |
| | 5.053 | 100.00 |

Limestone feed rates maintained during the runs appear in Table 4, below. Even though the Ca/S mole ratios of 6.03 and 4.75 appear a little high, the actual lime usage rate is well within commonly encountered bounds for higher sulfur coals. This is more easily observed by examining the ratio of lime feed/coal feed. As an example, a 4% sulfur coal requiring a Ca/S mole ratio of 3:1 would require a lime/coal weight ratio of 0.38. Thus, although the mole ratio may look high, because of the low sulfur content of the coal, the actual lime usage rate is within limits experienced in atmospheric fluidized bed steam generators.

TABLE 1

| | | | Combustion Efficiency Based on Carbon % | EMISSIONS CORRECTED TO 3% OXYGEN | | | | | | | | |
|---|---|---|---|---|---|---|---|---|---|---|---|---|
| | Average Bed Temp | Superf'l Velocity | | SOx (ppm) | | | NOx (ppm) | | | % CO | | |
| RUN # | (°F.) | (Ft/s) | | Avg. | Low | High | Avg. | Low | High | Avg. | Low | High |
| 1 | 1556 | 4.06 | 96.7 | 33 | 0 | 99 | 69 | 53 | 89 | 0.06 | 0.02 | 0.13 |
| 2 | 1549 | 3.99 | 94.9 | 8 | 0 | 18 | 76 | 54 | 89 | 0.08 | 0.02 | 0.23 |

The distribution of combustion air between the primary air injected in bed 20 and the overfire air injected by overfire air distributor pipe 40 is tabulated in Table 2, below. In each case, an initial stoichiometry of approximately 85% was necessary to provide the required reduction in NOx emissions. Measurements of CO prior to introduction of overfire air showed that the resultant CO emission was 0.6%-1.2% by volume with an average value of 0.8%. Optimum reduction of CO emissions without large increase in NOx emissions occurred at an overall stoichiometry of approximately 104%. This resulted in a residual $O_2$ level of 0.8% and 0.7%, respectively. During the original batch tests, equivalent NOx

TABLE 4

STAGED COMBUSTION MASS FLOW

| FLOW (lb/h) | Run 1 | Run 2 |
| --- | --- | --- |
| Coal | 111.3 | 108.4 |
| Limestone | 37.0 | 28.6 |
| Cyclone | 25.9 | 23.8 |
| Baghouse | 3.2 | 5.0 |
| lb Lime/lb Coal | 0.33 | 0.26 |
| Ca/S Mole Ratio | 6.03 | 4.75 |

Of great concern during the staged firing tests was the formation of calcium sulfide (CaS) in the partially reducing zones of the bed. This compound, whose formation is favored over calcium sulfate ($CaSO_4$) in reducing atmospheres, decomposes in water, producing hydrogen sulfide gas ($H_2S$) and calcium oxide (CaO). Thus, if present in large quantities in the waste bed material, it can create disposal problems.

To determine the severity of this potential problem, hot samples were removed from the bed and cooled in a sealed container prior to analysis. Similarly, samples from the cyclone and baghouse were also collected for analysis. The results of these analyses appear in Table 5, below.

TABLE 5

ANALYSIS OF SULFUR COMPOUNDS (% BY WEIGHT) IN COMBUSTOR EFFLUENT STREAMS

| | CYCLONE SAMPLE | | | BAGHOUSE SAMPLE | | | BED SAMPLE | | |
| --- | --- | --- | --- | --- | --- | --- | --- | --- | --- |
| RUN # | Total Sulfur (%) | Sulfate Sulfur (%) | Sulfide Sulfur (%) | Total Sulfur (%) | Sulfate Sulfur (%) | Sulfide Sulfur (%) | Total Sulfur (%) | Sulfate Sulfur (%) | Sulfide Sulfur (%) |
| 1 | * | * | * | * | * | * | 4.89 | 3.44 | 1.45 |
| 2 | 1.91 | 1.60 | 0.31 | 1.66 | 0.96 | 0.70 | 3.89 | 2.66 | 1.23 |

*Analysis not available.

As expected, all three samples contained varying amounts of calcium sulfide. Of greatest concern is the composition of the bed material, which will make up the majority of the waste stream. Sulfide contents of the bed material samples were found to be approximately 30% of the total sulfur captured. However, they amounted to only 1.45% and 1.23% on a total basis.

A solution to this problem is described and claimed in my copending application entitled "A Fluidized Bed Combustion System Utilizing Sulfide Conversion", Ser. No. 138,808, filed Apr. 9, 1980.

The above-described embodiments are intended to be illustrative, not restrictive. The full scope of the invention is defined by the claims, and any and all equivalents are intended to be embraced.

I claim:

1. A non-catalytic two stage combustion process for reducing emissions of nitrogen oxides (NOx) produced during combustion of nitrogen-containing fuel while maintaining efficient capture of sulfur oxides (SOx), comprising the steps of:
   (a) providing a non-catalytic fluidized bed of particulate material including a nitrogen-containing fuel without catalyst and an adsorbent for the capture of sulfur oxides (SOx), wherein the temperature in said non-catalytic fluidized bed is within the range of 1500° to 1650° F.;
   (b) introducing air into said fuel to fluidize said bed and promote the combustion of said fuel to form a primary combustion stage;
   (c) introducing additional fuel to said bed to replenish the combusted fuel;
   (d) controlling the fuel feed rate or controlling the air feed rate to achieve combustion in said primary combustion stage under continuous substoichiometric conditions; and,
   (e) providing a second combustion zone which is not a fluidized bed by introducing air into the combustion off-gas above said fluidized bed to produce combustion under stoichiometric conditions, wherein the temperature in said second combustion zone is within the range of 1300° to 1650° F.;
   whereby said combustion process has a reduced NOx emissions level while maintaining efficient capture of sulfur oxides (SOx).

2. The process defined in claim 1 wherein the heat produced by said process is used to add heat to water through a heat exchange relation.

3. The process defined in claim 1 wherein said nitrogen-containing fuel is coal.

4. The process defined in claim 1 wherein said non-catalytic fluidized bed is maintained at approximately atmospheric pressure.

5. The process defined in claim 1 wherein the residual oxygen ($O_2$) in the off-gas just above said non-catalytic fluidized bed is within the range of 0.4 to 0.8%.

6. The process of claim 1 further comprising the step of passing said off-gas through a cooling zone before it passes to said second combustion stage.

7. The process defined in claim 1 wherein the amount of air introduced in step (b) is approximately 85% of the stoichiometric amount.

* * * * *

REEXAMINATION CERTIFICATE (2071st)

United States Patent [19]

Taylor

[11] B1 4,308,810
[45] Certificate Issued   Aug. 3, 1993

[54] APPARATUS AND METHOD FOR REDUCTION OF NOX EMISSIONS FROM A FLUID BED COMBUSTION SYSTEM THROUGH STAGED COMBUSTION

[75] Inventor: Thomas E. Taylor, Bergenfield, N.J

[73] Assignee: Foster Wheeler Energy Corporation, Livingston, N.J.

Reexamination Request:
No. 90/002,801, Jul. 28, 1992

Reexamination Certificate for:
Patent No.: 4,308,810
Issued: Jan. 5, 1982
Appl. No.: 138,799
Filed: Apr. 9, 1980

[51] Int. Cl.$^5$ .................... F23D 1/00; F23M 3/04
[52] U.S. Cl. ...................... 110/347; 431/10; 122/4 D
[58] Field of Search ........... 110/214, 234, 245, 347; 122/4 D; 431/7, 10, 170

[56] References Cited

U.S. PATENT DOCUMENTS

| | | | |
|---|---|---|---|
| 3,110,300 | 11/1963 | Brown et al. | 122/4 D |
| 3,119,378 | 1/1964 | Marshall | 122/4 D |
| 3,356,075 | 12/1967 | Livingston | 431/10 |
| 3,625,164 | 12/1971 | Spector . | |
| 3,746,498 | 7/1973 | Stengel | 431/10 |
| 3,890,084 | 6/1975 | Voorheis et al. | 431/10 |
| 4,021,186 | 5/1977 | Tennev | 431/10 |
| 4,050,877 | 9/1977 | Craig et al. | 431/10 |
| 4,054,407 | 10/1977 | Carrubba et al. | 431/10 |
| 4,116,005 | 9/1978 | Willyoung | 122/4 D |
| 4,135,885 | 1/1979 | Wormser et al. . | |
| 4,246,853 | 1/1981 | Mehta | 110/347 |

FOREIGN PATENT DOCUMENTS

2510365  9/1976  Fed. Rep. of Germany .
2948481  6/1981  Fed. Rep. of Germany .

*Primary Examiner*—Henry C. Yuen

[57] ABSTRACT

Apparatus and method for the reduction of nitrogen oxides (NOx) in the emissions of a fuel burning fluidized bed combustion system. Using a staged combustion technique, an overfire air inlet is provided in the freeboard zone above the bed. In the first stage, residual oxygen ($O_2$) in the off-gas just above the bed is held in the 0.4 to 0.8% range by the actual coal and air rates. In the second stage, carbon monoxide (CO) and unburned hydrocarbons, both present in the first stage off-gas, are combined with additional air using the overfire air inlet. CO levels in the final effluent are reduced with little or no increase in NOx emissions.

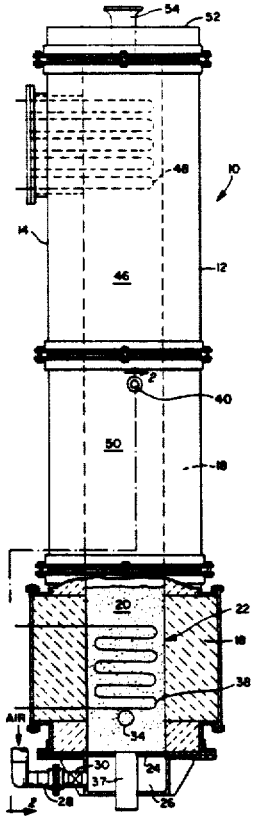

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made the patent.

AS A RESULT OF REEXAMINATION, IT HAS BEEN DETERMINED THAT:

The patentability of claims 5-7 is confirmed.

Claims 1-4 are cancelled.

New claims 8-11 are added and determined to be patentable.

8. The process of claim 5 or 6 or 7 wherein residual oxygen in the off-gas just above said second combustion zone is approximately 1%.

9. The process defined in claim 6 or 7 wherein the residual oxygen in the off-gas just above said non-catalytic fluidized bed is within the range of 0.4 to 0.8%.

10. The process of claim 5 or 7 further comprising the step of passing said off-gas through a cooling zone before it passes to said second combustion stage.

11. The process defined in claim 5 or 6 wherein the amount of air introduced in step (b) is approximately 85% of the stoichiometric amount.—

* * * * *